United States Patent [19]
Oldfield

[11] 3,929,440
[45] Dec. 30, 1975

[54] MANUFACTURE OF LASER GLASS
[75] Inventor: Lucy Florence Oldfield, Harrow Weald, England
[73] Assignee: The General Electric Company Limited, London, England
[22] Filed: Nov. 13, 1974
[21] Appl. No.: 523,513

[30] Foreign Application Priority Data
Nov. 30, 1973 United Kingdom............. 55627/73

[52] U.S. Cl. ...................... 65/32; 65/136; 65/178; 106/52; 106/DIG. 8
[51] Int. Cl.² .......................................... C03B 5/06
[58] Field of Search ............ 65/134, 135, 136, 178, 65/346, 347, 32; 106/52, DIG. 8

[56] References Cited
UNITED STATES PATENTS

| | | |
|---|---|---|
| 3,640,890 | 2/1972 | Lee, Jr. et al..................... 106/52 X |
| 3,656,924 | 4/1972 | Chapman et al................. 65/134 X |
| 3,677,960 | 7/1972 | Ishiyama........................... 106/52 X |
| 3,775,077 | 11/1973 | Nicastro et al. ................. 65/134 X |

Primary Examiner—Arthur D. Kellogg
Attorney, Agent, or Firm—Kirschstein, Kirschstein, Ottinger & Frank

[57] ABSTRACT

A process for the manufacture of laser glass free from heterogeneities, such as platinum speck and gas bubbles, which tend to promote laser-induced damage in the glass laser rods, includes the steps of melting the glass-forming batch in a vessel of platinum or a platinum-based noble metal alloy, bubbling helium gas through the melt to remove bubbles of gas formed during the batch reaction, and refining the melt in the presence of a stream of dry oxygen-free rare gas, preferably argon, flowing over the surface of the melt. These steps are preferably carried out at a constant temperature, for example 1350°C to 1450°C for a preferred class of glasses, consisting of (by weight) 53–60% $SiO_2$, 11.5–13.5% $Li_2O$, 22–24% SrO, 0–4% $Al_2O_3$, 2.5–6.5% $Nd_2O_3$, optionally 0.5–1.5% $TiO_2$ and 0–0.1% $CeO_2$ as solarisation inhibitors, and optionally a small amount of a sensitizer. The refined melt is cast in a preheated mould, and the glass is annealed by cooling slowly from the upper annealing temperature.

8 Claims, No Drawings

MANUFACTURE OF LASER GLASS

This invention relates to a method of manufacturing laser glass, and is also concerned with the manufacture of laser rods from the glass produced by the method described.

It is known that glass lasers are prone to damage occurring under the application of the exciting radiation in operation, especially when the laser is operated under Q-switched conditions: the damage appears as localised regions of disintegration within the body, and/or at the surface, of the glass, and can lead to breakage of the laser rod. Such damage will always occur if the incident energy or power density exceeds a certain critical value, but occurs at considerably lower levels of incident energy and power if there are present in the glass heterogeneities such as inclusions or occlusions of material of significantly different dielectric constant or thermal energy absorption capacity from that of the glass itself. Examples of heterogeneities causing laser-induced damage to occur at relatively low energy or power levels are particles of metal or metal oxide derived from the glass melting crucible or furnace, crystalline particles resulting from incompletely dissolved batch materials or devitrification products, and bubbles of gas produced by the batch reactions during melting or occluded during casting.

In particular, laser glasses are usually melted in crucibles or furnaces formed of, or lined with, platinum or platinum-based alloys, and small particles of platinum or platinum oxides (or other metal or oxide), hereinafter referred to as "speck", become incorportated in the completed glass, as a result of vaporisation of platinum or other metal from the crucible or furnace lining at the glass melting temperature, followed by oxidation, vaporisation of the resulting oxides, and subsequent deposition of the oxide particles, and possibly some non-oxidized metal particles, on the surface of the molten glass, these deposited particles then being entrained in the body of the glass by convection or during casting of the melt. Speck damage is produced in localised regions around the individual particles in the glass, as a result of absorption of incident radiation by the particles, at input energy levels above a critical threshold value which varies according to the thermal absorption properties of the glass. The critical size of platinum speck inclusions and gas bubble occlusions in laser glass has been found to be 0.1 to 1.0 micron diameter for incident radiation of wavelength approximately one micron. With such inclusions and occlusions of sizes between these limits damage is liable to occur in operation of the laser, depending on the energy density and pulse duration.

Since platinum and platinum alloy vessels are particularly suitable, and generally used, for melting laser glasses, it is desirable that a means of preventing the incorporation of platinum and platinum oxide inclusions in the glass shall be found. Accordingly, it is an object of the present invention to provide an improved method of manufacturing laser glass, involving melting in a platinum or platinum-based alloy vessel, whereby the incorporation of undesirable inclusions, and also of gas occlusions, in the glass can be reduced or prevented.

According to the invention, a method of manufacturing a laser glass includes the steps of melting a batch of glass-forming materials in a vessel formed of, or having a lining of, platinum or a platinum-based noble metal alloy, bubbling helium gas through the melt for a sufficient length of time to remove any bubbles of gas formed during the batch reaction, and refining the melt in the presence of a dry, oxygen-free gas stream consisting of one or more of the gases neon, argon, krypton, and xenon, flowing over the surface of the melt at sufficient velocity to effect flushing of the said surface. The refined melt is cast in a suitable mould, and the cast body of glass is annealed during cooling.

The glass melting crucible or other vessel, or the lining thereof, is preferably formed of an alloy of platinum with a minor proportion, for example 5% to 10% by weight, of rhodium or gold. The batch materials, which should be of a high degree of purity, are preferably introduced into the melting vessel after the latter has been preheated to the required melting temperature, the actual temperature employed depending upon the composition of the glass to be produced. The consecutive steps of melting the batch, helium bubbling, and refining are preferably all carried out in the same vessel as a continuous process, over a total period of at least 24 hours, and preferably also at a constant temperature.

The bubbling of helium through the melt, which is suitably carried out for 1 to 2 hours, results in the removal, by mechanical scouring action, of gas bubbles formed by the batch reaction, and is further advantageous in that the helium prevents access of atmospheric oxygen to the melt, and carries platinum and platinum oxide (and/or other noble metal or metal oxide) vapours away from the surface of the melt. Some helium bubbles will be retained in the melt, but during the subsequent refining procedure these bubbles shrink as helium diffuses from them to the surface of the molten glass and is removed.

The refining process, the duration of which is suitably at least 18 hours, is preferably carried out in a flowing atmosphere of dry, oxygen-free argon, although the other relatively heavy rare gases can be used. The rare gases have low solubility in the glass melt, so that the partial pressure of the gas in the melt approaches zero. The gas stream should be under sufficient pressure to effect a sweeping action over the surface of the glass melt, thus flushing noble metal and noble metal oxide vapours away from the vicinity of the melt as they are formed, as well as removing residual helium which has diffused to the surface of the glass. In a preferred method of carrying out the gas flushing of the melt surface, the flushing gas is introduced continuously through an opening in the top of a shield of refractory material which is supported over and around the vessel substantially filled with molten glass, the shield being of such dimensions that there is an annular space between the exterior of the vessel wall and the interior surface of the shield: the gas stream impinges upon the surface of the melt and then passes out over the sides of the vessel, through the said annular space, and beneath the bottom of the shield, entraining with it the vapours formed above the surface of the melt. In this way substantially all of the vapour of platinum and platinum oxide (and/or other noble metal and metal oxide) derived from the melting vessel during the refining process is removed; any small quantity of residual particles of noble metal or oxide which may be retained in the melt will eventually dissolve in the glass, so that no particles in the critical size range, referred to above, will remain in the finished glass.

On completion of the refining step the melt is cast in a mould formed of, or lined with, a material to which the glass does not adhere, the mould preferably being preheated at least to the lower annealing temperature of the glass, in order to minimise the occurrence of temperature gradients in the glass body during cooling and annealing. The cast block of glass is annealed by being cooled slowly from the upper annealing temperature of the glass to room temperature, over a period of time depending on the thickness of the block but preferably not less than 24 hours, in order to ensure that the finished glass block is in a suitable condition for enabling laser rods to be cut from it. If the cast block is found, after cooling and annealing, to contain an undesirable proportion of striae, it may be broken up into cullet and remelted in the melting vessel, the helium bubbling and refining steps being repeated before again casting and annealing. Remelting might be desirable especially in the cases of relatively large cast blocks, to ensure that the glass is free from inhomogeneities. Laser rods fabricated from the glass block, or blanks cut from the block for the fabrication of laser rods, are re-annealed, by heating them to a temperature close to the upper annealing temperature of the glass, and cooling slowly to room temperature, at a rate depending on the thickness of the rods in known manner, usually over a period of at least 24 hours.

The method of the invention can be advantageously employed, for example, for the manufacture of laser glasses of the neodymium-doped lithium silicate type, containing an alkaline earth metal oxide and optionally alumina. Thus in a preferred form of the invention, the batch of glass-forming materials employed is of a composition such that the glass produced consists essentially of, in proportions by weight, 53% to 60% silica ($SiO_2$), 11.5% to 13.5% lithium oxide ($Li_2O$), 22% to 24% strontium oxide (SrO), 0 to 4% alumina ($Al_2O_3$), and 2.5% to 6.5% neodymium oxide ($Nd_2O_3$). The batch suitably consists of vitreous silica, lithium carbonate, strontium carbonate, neodymium oxide, and alumina if required, in appropriate relative proportions.

If desired, a small proportion of an oxide of a suitable laser sensitizer element, preferably chromic oxide, may also be included in the batch of glass-forming materials. The proportion of such oxide in the glass will usually be less than 0.1% by weight.

It is, furthermore, desirable to include a solarisation inhibitor in a glass of the above-described type since, even with glasses of the high degree of purity which is requisite for laser glasses, some darkening is liable to occur under the influence of ultra violet radiation. The preferred anti-solarisation additive is titanium dioxide, in a proportion of 0.5% to 1.5% by weight of the glass; if desired a small proportion of cerium oxide, $CeO_2$, not exceeding 0.1% by weight of the glass, may be incorporated in conjunction with the titanium dioxide. These oxides are included in the initial batch if required.

The phrase "consists essentially of", as used above with reference to the preferred glass compositions, is to be understood to allow for the inclusion of a sensitizer and/or a solarisation inhibitor as the only deliberate additions to the composition specified. Apart from these optional additions, the glass should be substantially free from constituents other than those included in the said composition. In particular iron, and any ions which absorb radiation of the emission wavelengths of neodymium, namely 1.06 microns, or of wavelengths in the neodymium pumping bands should be excluded as far as possible, and the total content of transition metal oxides (apart from the aforesaid optional additions) should be less than 5 parts per million, and preferably less than 2 parts per million, by weight.

In the manufacture of the preferred glasses specified, the batch melting, helium bubbling and refining steps are carried out at a temperature in the range of 1350°C to 1450°C, which is preferably kept constant throughout the process, and the total duration of these steps is from 24 to 48 hours. Aluminium alloy moulds, coated internally with a suitable mould release agent, such as graphite, are suitably used for casting the melt, and the glass is annealed by cooling from 480°C to room temperature over a period of 24 to 72 hours.

Glasses of the compositions specified above give laser rods having low threshold energies, in the range of 8 to 16 joules, and high slope efficiencies, in the range of 1% to 3%, in both cases for rods of 0.25 inch diameter, and under optimum operating conditions in respect of the design of the laser resonator cavity. (The threshold energy is the minimum input energy required to induce lasing action, and the slope efficiency is the slope of a line drawn by plotting output energy against input energy, both in joules, expressed as a percentage).

The upper concentration of the anti-solarisation oxides is limited by the tendency of these oxides to promote phase separation, for example due to devitrification, within the lithium silicate glass during the cooling and annealing stages in the manufacture of the glass. Such phase separation is deleterious to the optical quality of the glass since it causes light scattering, this latter phenomenon also resulting in a reduction in the slope efficiency of the laser rods. We have found that phase separation is particularly liable to occur in glasses containing relatively high proportions of neodymium oxide in conjunction with titanium dioxide, with or without chromic oxide; we have further found, however, that the tendency for phase separation to occur can be reduced or eliminated, and hence the optical quality of the glass and the slope efficiency of the laser rods can be improved, by including only small proportions of alumina in, or preferably excluding alumina from, such glasses.

If desired, the solarisation inhibitor may be omitted from the glass composition, and solarisation of the glass laser rods in operation may be prevented by other known means, for example by the provision of a U.V. filter external to the laser rod and within the resonator cavity, suitably a glass filter containing ferric oxide and titanium dioxide, or by employing a glass containing these oxides for the construction of the envelope of the flash lamp constituting the pumping source, or by providing the laser rod with a cladding of U.V.-absorbing glass free from neodymium.

A specific method, in accordance with the invention, which we have employed for the manufacture of laser glasses will now be described by way of example, together with a procedure for fabricating laser rods from the glasses. The compositions of some glasses which we have produced by the method described, and some of the characteristics of laser rods composed of these glasses, are given in the following Table.

The same procedure was employed for the manufacture of all of the glasses shown in the Table. In each case the batch materials used consisted of crushed synthetic vitreous silica of the highest available purity grade, together with carbonates of lithium and strontium, neodymium oxide, alumina for glasses 1, 2 and 4, and titanium dioxide for glasses 2, 3 and 4, all these ingredients being of high purity. The batch ingredients, in the requisite relative proportions to produce the desired glass composition, were mixed in known manner to give a homogeneous batch producing 1 Kg of molten glass. This batch was then introduced into a carefully cleaned crucible formed of an alloy consisting of 95% platinum and 5% rhodium, the crucible being enclosed in an electric furnace and preheated to 1400°C before the introduction of the batch. The batch melted rapidly, and the batch reactions were allowed to go to completion, so that no crystalline material remained although the melt was still seedy, before proceeding to the next stage of the process. The melting was carried out in air.

A platinum alloy bubbling tube was then inserted into the melt, so that the lower end of the tube was just clear of the bottom of the crucible, and dry helium gas was passed into this tube and bubbled through the melt at a rate of 60 to 80 bubbles per minute, for 1 hour, the temperature of the melt being maintained at 1400°C. Gas bubbles produced by the batch reactions were thus removed from the melt, and at the same time any platinum and platinum oxide vapours, and possibly rhodium and rhodium oxide vapours, formed at the surface of the melt were carried away.

A vitreous silica shield in the form of an inverted vessel of shape similar to a bell jar, with a tubular gas inlet extending from an aperture in the top, was then placed over the crucible and was supported in such a position that there was an annular space between the shield and the crucible wall, and the tubular extension protruded through a hole in the roof of the furnace. The refining process was then carried out, over a period of 24 hours, with the temperature of the melt held at 1400°C, and with a stream of dry oxygen-free argon passing through the inlet tube into the crucible, sweeping over the surface of the melt, passing out through the space between the shield and the crucible wall and beneath the bottom of the shield, and finally escaping through the hole in the furnace roof; platinum and platinum oxide vapours were thus swept away from the vicinity of the melt surface and condensed on leaving the furnace, the condensed material being deposited on the outside of the furnace roof around the hole or the gas inlet tube. At the same time residual helium in the melt diffused to the surface and was also swept away.

On completion of the refining process the melt was cast into an aluminium alloy (Dural) mould, the interior surface of which was buffed, coated with graphite and then re-buffed; the mould was preheated to 380°C. The cast melt was allowed to cool to 480°C, and the glass was then annealed by cooling from 480°C to room temperature over a period of 72 hours.

Sections from the annealed glass blocks were tested for laser-induced damage thresholds, the sections being subjected to irradiation by an externally generated focussed Q-switched laser beam having a full wave half height pulse width of 10 nanoseconds, the power input being progressively increased, and the power and energy density incident at points of damage being measured. In the cases of glasses of the compositions shown in the Table below, manufactured by conventional methods, the speck damage threshold (that is to say the maximum incident energy density withstood without the occurrence of damage due to platinum (or other noble metal)speck) is 10 megawatts per square millimeter, and the void damage threshold (the maximum incident power density withstood without the occurrence of damage due to occluded gas bubbles) is 15 megawatts per square millimeter. In the tests carried out on the glasses produced by the method of the example, both of these thresholds were passed without the occurrence of any detectable damage in the glass sections, the only damage thresholds observed, under the conditions specified above, being 35 — 40 megawatts per square millimeter for surface damage, and greater than 50 megawatts per square millimeter for bulk damage: it was thus apparent that the glasses were free from speck and gas bubbles.

Blanks slightly larger than the required laser rods were cut from the annealed glass blocks, and were re-annealed by heating to 480°C ± 10°C and cooling to room temperature over a period of 24 hours. Laser rods from 3 to 3.25 inches long and 0.25 inch in diameter were then fabricated from the annealed glass blanks, and polished in known manner. Measurements of lasing characteristics of the rods were made, the rods being mounted in a circular close-coupled silver cavity between a 100% reflectance mirror or prism and a 83% reflectance output mirror, with a xenon-filled flash tube as the pumping source; the arrangement was Q-switched to give 10 pulses per second, the full wave half height pulse width of the laser output beam being 10 nanoseconds. The characteristics determined, and shown in the Table below, were the threshold energy, the output energy in the form of radiation of wavelength 1.06 microns, in millijoules, obtained for 30 joules input, and the slope efficiency.

TABLE

| Compositions of glasses Constituent oxides | Glass 1 | Glass 2 | Glass 3 | Glass 4 |
| --- | --- | --- | --- | --- |
| $SiO_2$ | 55.8 | 54.8 | 57.8 | 57.6 |
| $Li_2O$ | 12.4 | 12.4 | 12.4 | 12.4 |
| SrO | 23.0 | 23.0 | 23.0 | 23.0 |
| $Al_2O_3$ | 3.0 | 3.0 | 0 | 3.0 |
| $Nd_2O_3$ | 5.8 | 5.8 | 5.8 | 3.0 |
| $TiO_2$ | 0 | 1.0 | 1.0 | 1.0 |
| Characteristics of laser rods | | | | |
| Threshold energy, J | 16 | 15 | 16 | 13 |
| Output, mJ, for 30 J input | 290 | 260 | 310 | 350 |
| Slope efficiency,% | 2.1 | 1.7 | 2.2 | 2.1 |

The effect on the slope efficiency of the rods, of variations in the total content of alumina, titania and neodymium oxide, and in particular the improvement obtained by omitting alumina from a glass having a high neodymium oxide content in conjunction with titania, is apparent from the above Table.

I claim:

1. A method of manufacturing a laser glass, which includes the steps of melting a batch of glass-forming materials in a vessel at least the interior surface of which is formed of noble metal consisting at least mainly of platinum, bubbling helium gas through the melt for a sufficient length of time to remove any bubbles of gas formed during reaction of the batch, refining the melt by heating for at least 18 hours in the presence of a dry, oxygen-free gas stream consisting of at least one of the gases of the group consisting of neon, argon, krypton and xenon, said gas stream being caused to flow over the surface of the melt at sufficient velocity to effect flushing of the said surface, casting the refined melt in a mould preheated at least to the lower annealing temperature of the glass, and annealing the cast body of glass by cooling the said body from the upper annealing temperature of the glass to room temperature over a period of not less than 24 hours.

2. A method according to claim 1, wherein at least the interior surface of said vessel is formed of an alloy composed of 90% to 95% platinum and 5% to 10% of a metal of the group consisting of rhodium and gold, by weight, and wherein the said vessel is preheated to the required melting temperature before the said batch is introduced into the vessel.

3. A method according to claim 1, wherein the steps of melting the batch, helium bubbling, and refining the melt are all carried out in the same vessel as a continuous process, over a total period of at least 24 hours, and at a constant temperature.

4. A method according to claim 1, wherein the batch of glass-forming materials employed is of such a composition that the glass produced consists essentially of, in proportions by weight, 53% to 60% silica ($SiO_2$), 11.5% to 13.5% lithium oxide ($Li_2O$), 22% to 24% strontium oxide (SrO), 0 to 4% alumina ($Al_2O_3$), 2.5% to 6.5% neodymium oxide ($Nd_2O_3$), 0 to 1.5% titanium dioxide ($TiO_2$), and 0 to 0.1% cerium oxide ($CeO_2$), wherein the batch melting, helium bubbling and refining steps are carried out at a temperature in the range of 1350°C to 1450°C, which is kept constant throughout the said steps, and the total duration of said steps is from 24 to 48 hours, wherein the molten glass is cast into an aluminum alloy mould coated internally with a mould release agent, and wherein the glass is annealed by cooling from 480°C to room temperature over a period of 24 to 72 hours.

5. A method according to claim 1, wherein the batch of glass-forming materials employed is of such a composition that the glass produced consists essentially of, in proportions by weight, 53% to 60% silica ($SiO_2$), 11.5% to 13.5% lithium oxide ($Li_2O$), 22% to 24% strontium oxide (SrO), 0 to 4% alumina ($Al_2O_3$), 2.5% to 6.5% neodymium oxide ($Nd_2O_3$), and 0 to 1.5% titanium dioxide ($TiO_2$), a crucible formed of an alloy consisting of 95% platinum and 5% rhodium, by weight, is preheated to a temperature of 1400°C and the said batch is then melted in the said vessel, in air, then dry helium gas is passed into the melt through a platinum alloy bubbling tube and is bubbled through the melt at a rate of 60 to 80 bubbles per minute for 1 hour while the temperature of the melt is maintained at 1400°C, then a shield in the form of an inverted vitreous silica vessel with a gas inlet tube extending from an aperture in the top thereof is supported over and around the crucible so that an annular space is provided between the interior surface of the shield and the exterior of the crucible wall, and the melt is refined by being held at a temperature of 1400°C for 24 hours while a stream of dry oxygen-free argon is passed through the said inlet tube under sufficient pressure to cause it to sweep over the surface of the melt, then the melt is cast in a graphite-lined aluminium alloy mould preheated to 380°C, the cast melt is allowed to cool to 480°C, and the glass is annealed by cooling from 480°C to room temperature over a period of 72 hours.

6. A method of manufacturing a laser rod which comprises manufacturing a glass by the method according to claim 1, fabricating a rod from the said glass, and annealing the rod by heating it substantially to the upper annealing temperature of the glass and cooling it to room temperature over a period of at least 24 hours.

7. A method of manufacturing a laser rod which comprises manufacturing a glass by the method according to claim 5, cutting a blank slightly larger than the required rod from the said glass, annealing the blank by heating it to a temperature of 480°C ± 10°C and cooling it to room temperature over a period of 24 hours, and fabricating a rod from the annealed glass blank.

8. A method according to claim 1, wherein during the said refining step the said gas stream is introduced continuously through an opening in the top of a shield of refractory material which is supported over and around the vessel containing the molten glass and which is of such dimensions that there is an annular space between the interior surface of the shield and the exterior of the vessel wall, whereby the gas stream impinges upon the surface of the molten glass and then passes out over the sides of the vessel, through the said annular space, and beneath the bottom of the shield, entraining with it the vapors formed above the surface of the molten glass.

* * * * *